Sept. 25, 1951 G. HOLLIS Re. 23,412

SNAP-ACTION ELECTRIC SWITCH

Original Filed June 13, 1946

Inventor:
Gilbert Hollis
By John E. Eastlack
Attorney

Reissued Sept. 25, 1951

Re. 23,412

UNITED STATES PATENT OFFICE 23,412

SNAP-ACTION ELECTRIC SWITCH

Gilbert Hollis, London, England, assignor to Sidney Geoffrey Young, London, England Original No. 2,460,087, dated January 25, 1949, Serial No. 676,403, June 13, 1946. Application for reissue January 14, 1950, Serial No. 138,695. In Great Britain June 26, 1945

10 Claims. (Cl. 200—67)

Matter enclosed in heavy brackets [ ] appears in the original patent but forms no part of this reissue specification; matter printed in italics indicates the additions made by reissue.

This invention relates to snap-action electric switches of the kind in which the contact making member is formed as a spring member, constructed and arranged so as to have a tendency to snap over in one direction or the other when moved past a dead centre by the switch actuating member.

The object of the present invention is to provide a simple and effective form of switch of this character having a small number of parts and with improved electrical and mechanical performance, a switch in accordance with the invention having a wiping action between contact surfaces at the instant of contact separation with rapid contact movement so as to improve the electrical performance while the mechanical arrangement ensures a minimum of wear.

Snap-action switches of various types have been proposed, in which the snapper is stamped out of a single thin sheet of spring metal and so distorted or mounted as to have a permanently stressed portion which is snapped backwards and forwards over a dead centre position in response to the switch operating mechanism. For example, the snapper may be in the form of a rectangular flexible framework having a pair of opposed inwardly extending tongues. The operating member is in the form of a wedge adapted to be forced between the tongues, thereby stressing the frame and causing it to snap into a bowed position. Alternatively, the snapper may be formed from a single spring sheet, having a slit down its centre, and being crimped on one side of the slit. In this way the snapper is permanently stressed and has two alternative equilibrium or rest positions. When secured at one end and acted on by an external thrust it is caused to snap over to one or the other of these rest positions. In yet another form the snapper is stamped out to form three parallel elongated members joined at both ends by cross-members. The two external elongated members are shortened by crimping with the result that the central member is given a permanent bend susceptible to pressure by an operating member.

In yet another switch of this type, a central spring tongue anchored at one end and having a contact at the other is provided with compressed spring members, leading from the contact end and bearing against abutments in the switch housing. An operating plunger bears against the spring through the switch housing.

Another known switch construction incorporates a tongue secured to a base and having two crimped side members extending parallel to it and joined at their free ends by a contact member. A separate link member is provided between the outer end of the tongue and the inner edge of the contact, and a thrust imparted to the tongue is transmitted through the link and causes the contact to snap over.

As will be seen from the preceding description, the methods of operation of these known switches are widely varied but nevertheless they have certain features in common. With the exception of the last-mentioned construction, the snapper is not intrinsically extensible so that the force required to operate it must be applied from an operating system rather than a single operating member. That is to say, assuming the snapper to be secured to or resting on abutments on the switch mounting, the operating member must also be pivoted to, or in some other way, exert its force relative to, the switch mounting. Equally, in the last mentioned construction, the connecting link is an essential feature of the switch and operation by a single member not supported by the switch mounting is impossible.

The object of the present invention is to provide an improved switch of excellent performance and having the minimum number of moving parts. The snapper is formed from a single sheet of spring metal and is operated by a single operating member. The snapper is made with two flexible and extensible side members joined at one end by a cross member which comprises one of the contacts of the switch and from which there extends inwardly a relatively rigid tongue-like member. In the preferred form the other ends of the flexible members are joined by a similar cross-member provided with a similar inwardly-extending tongue, the free edges of the two tongues thus facing one another a short distance apart. While this construction is necessary in the case of a double-pole switch as will be described later, it is optional in the case of a tumbler or single-pole switch, since the function of the second named tongue is to act as an abutment for the single operating member, the end of the snapper associated with this tongue being rigidly mounted on the base of the switch. Thus, precisely equivalent results can be achieved by merely anchoring the flexible side members and providing a separate fixed abutment on the base of the switch.

The single operating member which may be a partially rotatable dolly arm in the case of the tumbler switch, or a grooved rod in the case of a push-pull switch is located between the two tongues or between the tongue and the abutment in the case of a tumbler switch, where a fixed abutment is provided in lieu of and as equivalent to the second tongue.

Movement of the operating member tends to cause the tongues to pivot relative to the plane of the snapper. Thus, considering a snapper as described above, secured at one end to the base of the switch and with a contact at the other end, and having a grooved dolly arm mounted between the two tongues, rotation of this dolly arm even though it is completely separate from the switch mounting causes flexion and extension of the side members of the snapper coupled with a pivoting of the contact-bearing tongue with a snapping action as the snapper passes over dead centre.

In the case of a double-pole switch, the snapper is symmetrical and has contacts at each end. In one position these contacts rest on corresponding fixed contacts in the switch housing and (for example), a grooved rod is located between the two inwardly facing tongues. Movement of this rod causes pivoting of the two tongues in opposite directions, flexion and extension of the side members, and the snapper snaps over to its alternative position resting on a second pair of fixed contacts within the switch housing.

It will be seen that this improved switch construction requires fewer moving parts than any known type. Furthermore, it has been found, in practice, that when submitted to standard tests a switch made in accordance with the present invention has a longer life than any other make tested.

One embodiment of the present invention, in the form of a tumbler type switch, is shown in the attached drawings, in which Figure 1 represents a side view of the completed switch, Figure 2 represents a front view of the completed switch, Figure 3 represents a front view of the completed switch, with the cover removed.

Figure 1:
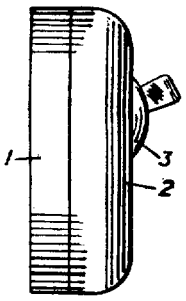
Figure 2:
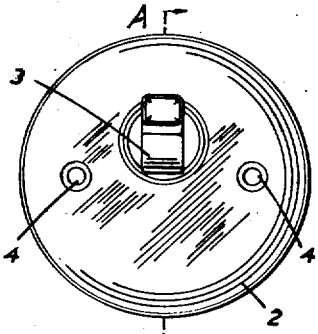

Figures 1 and 2 show a base 1 and a cover 2, which may be made of any suitable insulating material, as may the dolly arm or switch operating member 3. Screws and screwholes 4 are provided for attaching the cover to the base, and the base itself is provided with screwholes 5 by means of which it may be secured in position on a wall or the like. All of this is conventional practice.

Figure 3:
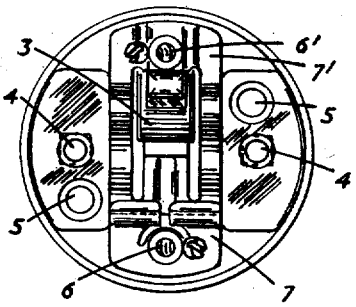

Figure 3 shows a front view of the switch with the cover off. Two terminals 6, 6′ to take the leads of the circuit in which the switch is to be inserted, are attached to fixed and moving contacts 7 and 7′ respectively. The dolly arm 3 acts on the moving contact 7′ so as to make and break contact between the contacts 7 and 7′, according to the position of the arm 3.

Figure 4:
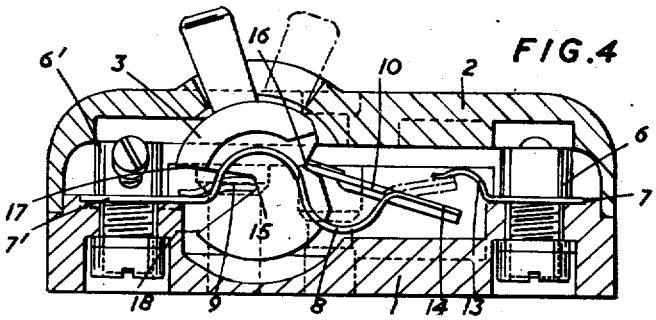
Figure 4 is a section on the line A—A in Figure 2.
Figure 5:
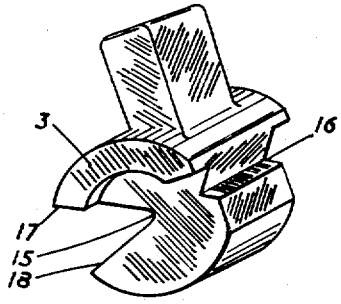
Figure 5 shows the operative components of the switch.
Figure 5:
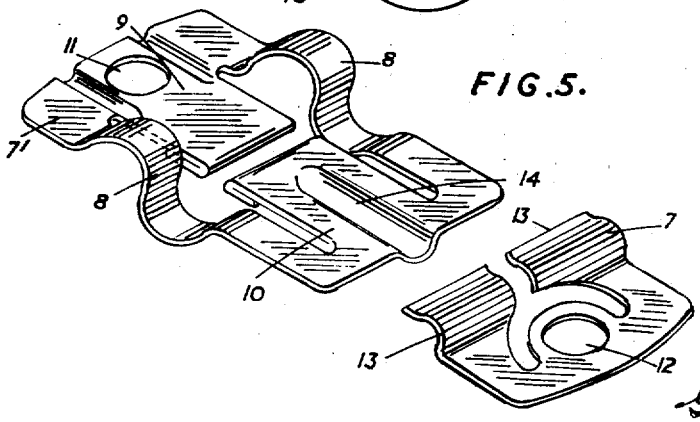

The method of operation of the switch will be more clearly understood by reference to Figure 4, in which a sectional view of the switch as a whole is shown, and to Figure 5 which shows its operating parts.

The moving contact 7′ is constructed of thin spring metal, such as a beryllium-copper alloy, and in this preferred embodiment of the switch is formed by a single stamping so as to form a contact consisting essentially of four main parts, namely, two flexible and extensible side members 8, a comparatively rigid link member 9, and a comparatively rigid tongue-like member 10. In the link member 9 there is conveniently situated a hole 11, by means of which the contact 7′ is secured to the terminal 6′. The fixed contact 7 is formed with a hole 12 by means of which it may be secured to the terminal 6. It may be made of any suitable metal such as Phosphor bronze, and in the preferred embodiment of the invention as shown in Figure 5, is slotted so that a certain amount of resilience is imparted to the actual contact surfaces 13, the under surfaces of which co-operate with the upper surfaces of the tongue-like member 10, when the switch is closed. The tongue 10 may be formed with a stiffening groove 14, adapted to coincide with the gap between the contact surfaces 13 of the contact member 7.

It will be realised that this description is given by way of example only, and in no way restricts the spirit of the invention.

As will be seen from Figure 5, the dolly arm or operating lever 3 is formed with two grooves or recesses 15 and 16, and is mounted in the switch (Figure 4) so that the inwardly projecting ends of the link member 9 and the tongue-like members 10 engage in the recesses 15 and 16 respectively.

Then it will be seen, by reference to Figure 4, that the lever may be rotated in an anti-clockwise direction until the upper surface 17 of the recess 15 bears upon the fixed tongue 9. This rotation causes a corresponding opposite rotation of the tongue-like member 10 and tension and extension of the flexible side members 8, until the member 10 passes the dead-centre position after which it snaps over to break contact between 13 and 14, finishing in a position substantially as shown in full lines in Figure 4.

When the dolly-arm 3 is rotated in a clockwise direction the reverse procedure takes place. The tongue-like member 10 is pivoted in an anti-clockwise direction and the flexible side members 8 are stressed and extended, until the member 10 passes the dead-centre position, when the stored energy in the side members 8 serves to snap the member 10 into contact with the member 7, so that the surfaces 13 and 14 engage as shown in broken lines in Figure 4. Further movement of the arm 3 is prevented by the lower surface 18 of the recess 15 coming to bear against the link member 9.

Apart from the ease and simplicity of construction and assembly of the improved switch, it will be seen that the advantages of such switch include a rapid and positive snap action in both directions together with a good wiping effect caused by the moving contact sliding upon the fixed contact when circuit is either made or broken.

Obviously wide variation is permissible in the selection of materials for the construction of switches according to the present invention, and for the design of individual components. Thus details such as the grooving of the tongue-like moving contact, and slotting of the fixed contact, while desirable, are not essential. Similarly, although it is convenient to make use of an extension on the moving contact member as a stop for the dolly arm, this is not essential and alternative stops may be provided. The principles of the present invention may also be embodied in multiple switches, mechanically or automatically operated switches and the like.

Thus, the invention is not to be limited to the foregoing details of construction, which are given by way of example only.

I claim:

1. In a snap-action electric switch having a fixed and a movable contact mounted on an insulating base, the improvement which comprises constructing the said movable contact in the form of a snapper from a single piece of spring metal, the said snapper being in the form of a frame having a pair of flexible and extensible side members linked at their ends by cross-members, comparatively rigid tongues extending inwardly from the cross-members to points intermediate of the flexible and extensible side members, one of the said cross-members being anchored to the insulating base and the other being adapted to make contact with the said fixed contact, and an operating member adapted to engage with the opposed edges of the tongues being freely held between and by the said tongues.

2. In a snap-action electric switch having a fixed and a movable contact mounted on an insulating base, the improvement which comprises constructing the said movable contact in the form of a snapper from a single piece of spring metal, the said snapper being in the form of a frame having a pair of flexible and extensible side members linked at their ends by cross-members, a comparatively rigid tongue extending inwardly from one of the cross-members to a point intermediate of the said flexible and extensible side members, the other cross-member being anchored to the insulating base, and the cross-member from which the tongue extends being adapted to make contact with the said fixed contact, a fixed abutment being provided on the base in such manner that the edge of the rigid tongue faces the abutment and an operating member adapted to engage with the edge of the tongue and the abutment being freely held between and by the edge of the rigid tongue and the said abutment.

3. In a snap-action electric switch having a fixed and a movable contact on an insulating base, the improvement which comprises constructing the said movable contact in the form of a snapper from a single piece of spring metal, the said snapper having a cross- member adapted to make contact with the said fixed contact, a pair of flexible and extensible side members extending from the cross-member and being anchored at their free ends to the insulating base, a comparatively rigid tongue extending inwardly from the cross-member between and to a point intermediate of the side members, a fixed abutment being provided on the base in such manner that the edge of the rigid tongue faces the abutment, and an operating member adapted to engage with the edge of the tongue and the abutment being freely held between and by the edge of the rigid tongue and the said abutment.

4. A snap-action electric switch comprising a fixed and a movable contact mounted on an insulating base, the movable contact being constructed in the form of a snapper from a single piece of spring metal, the said snapper being in the form of a frame having a pair of cross members linked by a pair of transversely corrugated side members, comparatively rigid tongues extending inwardly from the cross-members to points intermediate of the corrugated side members, one of the said cross-members being anchored to the insulating base and the other being adapted to make contact with the fixed contact, an operating member having grooves adapted to engage the opposed edges of the tongues being freely held between and by the said tongues.

5. A snap-action electric switch comprising a fixed and a movable contact mounted on an insulating base, the movable contact being constructed in the form of a snapper from a single piece of spring metal, the said snapper being in the form of a frame having a pair of cross members linked by a pair of transversely corrugated side members, comparatively rigid tongues extending inwardly from the cross-members to points intermediate of the corrugated side members, one of the said cross-members being anchored to the insulating base, and the other being adapted to make contact with the fixed contact, an operating member in the form of a dolly-arm having grooves adapted to engage the opposed edges of the tongues being freely held between and by the said tongues, the positions and sizes of the grooves being such that the tongue projecting from the anchored cross-member serves to limit the possible degree of rotation of the dolly arm by bearing against one of the surfaces of the corresponding groove, while the movement of the other tongue in response to movement of the corresponding groove and within the possible degree of rotation of the dolly arm, serves to snap the snapper over its dead centre position.

6. A snap-action switch according to claim 4, wherein the corrugations of each side member form one complete symmetrical S-shape.

7. A snap action switch according to claim 5, wherein the corrugations on each side member form one complete symmetrical S-shape.

*8. In a snap-action electric switch having a fixed and a movable contact mounted on an insulating base, the improvement which comprises constructing the said movable contact in the form of a snapper from a single piece of spring metal, said snapper having a pair of cross-members linked by flexible and extensible side-members, relatively rigid tongue-like members extending from each cross-member between and to a point intermediate of the length of the side-members, a unitary switch operating member movable in the switch, and situated between and engaged on each side by the opposing edges of the tongue-like members, abutments adapted to limit the motion of the snapper under the influence of the switch operating member, at least one of the said abutments being in the form of a fixed contact.*

*9. In a snap-action electric switch having a fixed and a movable contact mounted on an insulating base, the improvement which comprises constructing the said movable contact in the form of a snapper from a single piece of spring metal, said snapper having a pair of cross-members linked by flexible and extensible side-members, relatively rigid tongue-like members extending from each cross-member between and to a point intermediate of the length of the side-members, a unitary switch operating member movable in the switch, and situated between and engaged on each side by the opposing edges of the tongue-like members, abutments adapted to limit the motion of the snapper under the influence of the switch operating member, at least one of the said abutments being in the form of a fixed contact, and the extensible portions of the flexible side members being disposed substantially midway of the lengths of said members.*

*10. In a snap-action electric switch having a*

*fixed and a movable contact mounted on an insulating base, the improvement which comprises constructing the said movable contact in the form of a snapper from a single piece of spring metal, said snapper having a pair of cross-members linked by flexible and extensible side-members transversely corrugated on both sides of the median plane of the snapper, relatively rigid tongue-like members extending from each cross-member between and to a point intermediate of the length of the side-members, a unitary switch operating member movable in the switch, and situated between and engaged on each side by the opposing edges of the tongue-like members, abutments adapted to limit the motion of the snapper under the influence of the switch operating member, at least one of the said abutments being in the form of a fixed contact, and the ex-*

*tensible portions of the flexible side members being disposed substantially midway of the lengths of said members.*

GILBERT HOLLIS.

REFERENCES CITED

The following references are of record in the file of this patent or in the original patent:

UNITED STATES PATENTS

| Number | Name | Date |
|---|---|---|
| 1,960,020 | McGall | May 22, 1934 |
| 2,167,543 | Bugenhagen | July 25, 1939 |
| 2,194,533 | VanDyke | Mar. 26, 1940 |
| 2,204,949 | Riche | June 18, 1940 |
| 2,332,911 | Hausler | Oct. 26, 1943 |
| 2,387,,089 | Peterson et al. | Oct. 16, 1945 |
| 2,395,698 | Tiffany | Feb. 26, 1946 |